United States Patent Office 2,813,843
Patented Nov. 19, 1957

2,813,843

PRODUCT OF AND PROCESS FOR THE VULCANIZATION OF BUTADIENE RUBBERS

Alvin F. Shepard, Joseph T. Cardone, and Albert S. Jacobson, Le Roy, N. Y., assignors to Hooker Electrochemical Company, Niagara Falls, N. Y., a corporation of New York No Drawing. Application April 2, 1954,
Serial No. 420,747

10 Claims. (Cl. 260—43)

The present invention relates to the vulcanization of 1,3-butadiene polymers by means of hydroxy-aryl-aldehyde condensation products. More particularly, the present invention relates to a process for obtaining new and useful vulcanized materials which are the reaction products between a butadiene rubber of the aforesaid type and a new class of vulcanizing agents which are the condensation products of substituted phenols with formaldehyde. Additionally, it relates to the resulting products which possess both physical and chemical properties superior in many respects to the products resulting from the vulcanization of butadiene rubbers with the conventional vulcanizing agent, sulfur.

The term "1,3-butadiene polymer" as used above and throughout the specification including the claims embraces within its scope polymers of 1,3-butadiene, copolymers of 1,3-butadiene, and admixtures of the two. Examples of copolymers of 1,3-butadiene include such synthetic rubbers as butadiene-styrene copolymers and butadiene-acrylonitrile copolymers referred to hereinafter as GRS and GRN rubbers respectively.

Many attempts have been made to combine the prominent properties of the two classes of materials, the elastomers on one side and the phenolic plastics on the other, in such a way as to produce new materials of outstanding properties. These attempts have ranged all the way from a crude mixture of ground rubber as a filler in the phenolic molding compositions, or ground phenolic material as a filler in the rubber compositions, to the other extreme of forming new chemical compounds by combining representatives of the two classes chemically through a formation of primary valence bonds.

It is well known that, in the rubber industry as well as in the industry producing phenolic condensation products, the art has progressed much faster than the science, and this is even more true for the combination of these two fields, and much confusion exists regarding the interpretation of the phenomena observed when substances of these two classes are mixed or reacted with each other. The most scientific approach towards explanation of the phenomena occurring seems to be contained in two publications, one by Van der Meer, "The Vulcanization of Rubber with Phenol-Formaldehyde Derivatives," Naamlooze Vennootschop W. D., Meinema, Delft, and the other by Wildschut, Rec. trav. chim. 61, 898 (1942).

Wildschut investigated among other things the vulcanization of natural rubber by means of condensation products of p-tertiary amyl phenol with formaldehyde. He established the criteria for distinguishing between the results of intermingling the highly polymerized or condensed chains of rubber and resin molecules on one side, from a combination by means of cross-linking between them leading to a true vulcanization on the other. He offered proof of the correctness of his conceptions by investigating the solubility of mixtures of natural rubber on one side, and a paraffin "Oppanol" (polyisobutylene) on the other side, with his resins by subjecting the mixtures to the action of various solvents after heating.

Van der Meer investigated the reaction of natural rubber with the condensation products of numerous phenols with formaldehyde. He interpreted his results mostly on the basis of Wildschut's work and reached conclusions very similar to those of Wildschut.

The conclusion of these two investigators may be summarized as follows:

(1) Any mixture of a phenolic condensation product with rubber tends to increase, to a greater or lesser extent, the hardness, and tends to push it in a direction which would appear, on the surface, to approach a vulcanization.

(2) A true vulcanization, however, requires the cross-linking of the rubber hydrocarbon chains by means of the condensation products.

(3) Such cross-linking can occur only when the phenolic resins have at least two methylol groups per molecule.

(4) Not all condensation products having at least two methylol groups will vulcanize rubber.

(5) Those that do, will vulcanize rubber in a varying degree, ranging from a hardly perceptible vulcanization toward a vulcanization almost as good as that obtained with the classical rubber vulcanizing agent, sulfur.

(6) The difference in the degree of vulcanization obtained is explainable by the difference in the ratios of the rate of reaction between resin-resin on one side and resin-rubber on the other side. In other words, some resins condense with themselves, through their methylol groups, before they have an appreciable chance to react with rubber, resulting in inappreciable vulcanization. On the other end of the scale are those resins which have no tendency to condense with themselves, so that they are completely available for cross-linking the rubber molecules resulting in a high degree of vulcanization.

The scientific work of Wildschut and Van der Meer has found much attention in the rubber industry and their experiments have been repeated and extended in many industrial laboratories. The results of these experiments have not, however, led to any important industrial use, mainly because the phenols tested by them, comprising practically all of the phenols industrially available at that time, did not offer any technical or economical advantage over the customary vulcanizing agents such as sulfur and sulfur derivatives. Furthermore, the experiments referred, with the exception of a few experiments done with synthetic rubbers by Wildschut, almost exclusively to the vulcanization of natural rubber. The physical properties of natural rubber vulcanized with sulfur or sulfur derivatives are such that major improvements can hardly be expected from the use of condensation products instead of sulfur.

In accordance with the foregoing statement, if it were possible to generalize from the teaching of Wildschut and Van der Meer, who were interested in the vulcanization of natural rubber, and to apply their teaching to the vulcanization of butadiene rubbers, it would not be expected that the properties of the resultant products would in many cases be superior to the properties of a butadiene rubber vulcanized with the conventional vulcanizing agent, sulfur.

It is, however, an object of the present invention to improve the physical and chemical properties of butadiene rubbers by vulcanizing them with hydroxy-aryl-formaldehyde condensation products.

A further object of the present invention is to provide a vulcanized butadiene rubber and a process for producing the same, which vulcanized product possesses physical and chemical properties superior to those obtained with the customary vulcanization agents normally employed for vulcanizing butadiene rubbers.

A further object of the present invention is to improve the physical and chemical properties of the elastomers of the butadiene rubbers by vulcanization by means of hydroxyaryl-formaldehyde condensation products, alone or in combination with the customary vulcanizing agents, over and above the range of physical and chemical properties obtainable with the customary vulcanizing agents alone.

These and other objects will become more apparent upon considering the description of the present invention as set forth hereinafter.

In accordance with the present invention, we have discovered that when condensation products of certain substituted phenols with formaldehyde are intimately admixed with the polymers of 1,3-butadiene and subjected to an elevated temperature, the resultant products possess physical and chemical properties superior to those obtainable with the customary vulcanizing agents. This invention involves a number of unexpected findings:

(1) It was found that the physical and chemical properties of butadiene rubbers can be improved over and above those obtained with any of the customary vulcanizing agents, an observation which could not be expected from the facts published by Wildschut and Van der Meer who succeeded in vulcanizing natural rubber to a considerable extent, but never so far as to make the obtained products superior to those resulting from the use of sulfur as the vulcanizing agent.

(2) The few generalizations which evolved from the work of Van der Meer and Wildschut and other technical observers, as a result of work with natural rubber, were not found applicable to the vulcanization of butadiene rubbers. Both Wildschut and Van der Meer emphasized in their publications that phenols having only two active positions, the formaldehyde derivatives of which therefore can not cure to the insoluble and infusible condition, are preferable to phenols having three active positions. The theoretical explanation given for this fact is that phenols, having only two active positions, are less liable to react with themselves instead of with the rubber than are phenols having three active positions. The latter have a great tendency to form a crosslinked network of molecules instead of, but without having connection with, the rubber. Another technical observer advances a theory which is just the opposite. He recommends condensation products of phenol and formaldehyde which are hardenable to the insoluble and infusible state, for mixture with high molecular substances including natural rubber to obtain homogeneous products. But according to the present invention, butadiene rubbers can be vulcanized with resins derived from phenols either having two or three unsubstituted active positions. Contrary to Wildschut's and Van der Meer's teaching, for example, the dimethylol derivative of 3,5-xylenol is an excellent vulcanizing agent for GRS and contrary to this other observer's teaching, the dimethylol derivative of 2-t-butyl-5-methyl-phenol is an excellent vulcanizing agent for GRS.

(3) This other observer taught that the suitability of condensation products as additives to high molecular substances depends mostly on the number of carbon atoms in their side chains. According to him, a minimum of four in certain cases, but, in general, five carbon atoms is required to make the resins suitable for mixing with rubber-like substances. This observation was found to be incorrect. The 3,4,5-trimethylphenol derivatives having only three carbon atoms in the side chains, make excellent vulcanizing agents for GRS rubber.

(4) This same observer advanced the theory that compatibility of resins with high molecular substances is identical with their ability to react with them, which latter ability is identical with their ability to cross-link them. He overlooked that this teaching tries to wipe out the obvious differences of three obviously distinct steps in the behaviors of two substances toward each other. Substances are compatible with each other if their chemical and physical properties are sufficiently alike. No chemical combination between them is necessary and similarity in their physical and chemical properties militates normally against a chemical combination. An example of purely physical compatibility can be found, for instance, in the mixture of petroleum oil with GRS compositions. The next step would be a chemical combination between different substances held together with one chemical main valence bond. An example of the combination of this type is, the combination of hydrogen with rubber to form a hydrogenated rubber, which is certainly a true chemical compound, but which does not produce vulcanization. Vulcanization is the third step in which one molecule of the vulcanizing agent and two molecules of the rubber combine chemically, resulting in a cross-linking of the rubber chains.

We have found a great number of exceptions to the rule laid down by this same observer. Condensation products of m-pentadecylphenol with formaldehyde are excellently compatible with GRS rubber mixtures, but fail to vulcanize them. The dimethylol compound of 3,5-xylenol, for instance, is imperfectly compatible with GRS rubber, but nevertheless gives a vulcanized GRS of high quality. This same observer further teaches that reactivity with rubber is the greater, the smaller the molecule is. This teaching too does not hold true for GRS rubber mixtures. A high molecular resin prepared from tertiary amyl phenol, having a molecular weight of approximately 1000, is a better vulcanizing agent than the corresponding dialcohol having a molecular weight of 210.

A patent of this same observer covers an almost infinite number of high molecular substances including allegedly all types of rubbers both natural and synthetic, and an infinite number of phenol-aldehyde condensation products. It is surprising, with an infinite number of combinations possible, he should not have found a single case in which true vulcanization of a butadiene rubber with a phenol-formaldehyde condensation product occurred, but actually such is the case. He investigated several rubber-phenolic condensation product mixtures and he observed the usual influence of the resin upon the physical and chemical properties of the rubber. Specifically, he observed that natural rubber, vulcanized in the presence of certain resins, gave properties superior to rubber vulcanized in the same way in the absence of such resins, but he never observed explicitly that certain resins actually do vulcanize rubber. The closest he came to making this observation was when he mixed the formaldehyde condensation product of 3-methyl-5-isopropylphenol with natural rubber, a vulcanizing agent, filler, etc., and observed that the product had a higher tensile strength than a product obtained from the same starting materials without the resin. Whether in this case he obtained true vulcanization of the natural rubber by means of this particular resin appears doubtful. Van der Meer states in his book on page 15, last line, and on page 16, lines 1 to 7, "this observer indicated that it is possible in some instances to vulcanize rubber by means of a resol but he indicated also that in these cases too, the addition of the customary vulcanizing agent such as sulfur is preferable. From his investigation it is not apparent whether or not one can speak of a chemical reaction between rubber and resol."

Specifically, in accordance with the present invention, we have discovered that 1,3-butadiene polymers may be vulcanized with a vulcanizing agent which is the reaction product of at least 1.2 mol of formaldehyde per mol of phenol of the general formula:

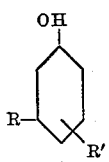

wherein R and R' are saturated substituents of aliphatic nature, and R and R' together contain collectively a total of less than 4 carbons atoms.

As will be shown hereinafter, the vulcanized materials of the present invention as produced in accordance with the process of the present invention obtain chemical and physical properties which exceed those obtainable when vulcanizing butadiene rubbers with the use of conventional vulcanizing agents.

Phenols represented by the general formula:

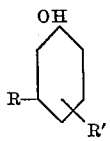

wherein R and R' are saturated substituents of aliphatic nature and contain collectively a total of less than 4 carbon atoms may be exemplified by 2,5-dimethylphenol, 3,5-dimethylphenol, 3-methyl-5-ethylphenol and 3,4-dimethylphenol. All of these phenols are commercially available and consequently the synthesis of the same need not be described here.

The vulcanizing agents of the present invention are in general prepared by reacting an excess of formaldehyde with phenol, i. e., at least 1.2 mol of formaldehyde per mol of phenol, in the presence of an alkaline catalyst such as sodium hydroxide at temperatures up to the boiling point of the reaction mixture for a period of time which is selected in accordance with the particular average molecular weight desired. Specific examples presented hereinafter will illustrate time factors required for the particular temperature employed in order to obtain reaction products of suitable molecular weight. Upon completion of the reaction, the product may be dehydrated and used as such, or it may be neutralized with a weak acid such as acetic acid, washed with water to remove salts, and dried. The molecular weight, melting point and other properties of the product may be modified by heating it so as to split off either water alone or water and formaldehyde.

The above methods of producing the vulcanizing agents of the present invention may be advantageously modified in order to obtain mononuclear dialcohols. In general, the modification comprises utilizing Methyl Formcel (a 40% solution of formaldehyde in methanol). Specific details of satisfactory methods for obtaining individual mononuclear dialcohols are presented in the examples hereinafter.

The chemical significance of the method of producing these vulcanizing resins, the limitation in their composition, and their ability to vulcanize, may be explained according to the work of authors like Zinke and others [Carswell, T. S., "Phenoplasts" (pp. 20–24), Interscience Publishers, Inc., New York, 1947], by the following theory. It should be understood here that we do not want to be limited, however, by this theory, but offer it only as a possible explanation for the facts which constitute this invention.

Resins having the ability to vulcanize rubber, according to the present invention, must have, according to this theory, at least two active groups per molecule.

Active groups may be of two types. One is the methylol group such as occurs, for instance, in the dialcohol,

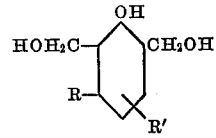

in the dinuclear compound,

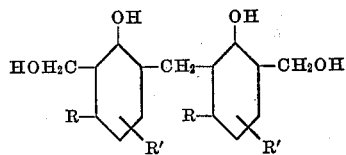

or in equivalent structures.

The second type of active group is the methylene ether group, formed by splitting off water between any two methylol groups of adjacent molecules of the compounds above.

Our observations can be interpreted as indicating that, during the process of vulcanization, each methylene ether group effects vulcanization to a degree equivalent to two methylol groups.

The active groups can be attached to one phenolic nucleus, as in the case of the dialcohol, or they can be attached at various points to molecules containing connected phenolic nuclei. Compounds containing less than 1.2 mols of formaldehyde per mol of phenol have either an insufficient concentration of active groups or contain the active groups at too great a distance from each other to permit an efficient vulcanization of rubber, as disclosed by the present invention.

The reaction products prepared according to this invention need not contain either methylene or methylene-ether linkages exclusively to connect the phenolic nuclei. When the products are prepared commercially, without any special precautions taken to limit the structure to either one type or the other, they will generally contain linkages of both the methylene and methylene-ether types.

It has been found that satisfactory vulcanizing action is obtained only when the molecular ratio of formaldehyde to phenol is at least 1.2:1. The tabulated data presented below will illustrate the criticality of using a reaction product having a formaldehyde to phenol ratio of at least 1.2:1. The data set forth were obtained with reaction products of formaldehyde and 2,5-dimethylphenol, using varying formaldehyde to phenol ratios, by employing them as curing agents for a GRS-carbon black rubber comprising approximately 66 parts by weight of GRS rubber and 33 parts by weight of carbon black. In all cases, 10% by weight of curing agent was intimately admixed with GRS-carbon black rubber and the mixture was cured under pressure for a maximum of two hours at a temperature ranging between 163 and 168° C.

| Molecular Ratio of Formaldehyde to Phenol | Mol. Wt. of Derivative | M. P. of Derivative, degrees | Tensile Strength of Rubber Cmpd. at Optimum Cure |
| --- | --- | --- | --- |
| 2 | 182 | 99.5–101 | 1,000. |
| 1.9 | 910 | 110–120 | 1,500. |
| 1.5 | 316 | 173–175 | 2,850. |
| 1.27 | | | 1,300. |
| 1.25 | | | (Just below range of testing apparatus.) |
| 1.1 | | | Not measurable. |

As shown in this table, the maximum vulcanizing action of this type of reaction product of formaldehyde and 2,5-dimethylphenol occurred at a formaldehyde to phenol ratio of about 1.5:1. In the case of vulcanizing reaction products prepared by other methods or from other phenols, the maximum vulcanizing action can be obtained by utilizing reaction products whose formaldehyde to phenol ratio may be a value other than 1.5:1 as in the example above, but where it is still above the value of 1.2:1. In several cases, as shown in the following table, the maximum vulcanizing action was observed to occur with reaction products having approximately a 2.0:1 formaldehyde to phenol ratio, indicating a structure approaching that of either the mononuclear dialcohol or the methylene-ether linked product formed by further condensation of the dialcohol.

| | Mol. Ratio of Formaldehyde to Phenol | Mol. Wt. of derivative | M. P. of Derivative | Tensile Strength of Rubber Cmpd. at Optimum Cure |
|---|---|---|---|---|
| 3,5-Dimethyl | 2 | 182 | 150–151° | 2,450. |
| | 1.9+ | | Infusible | Not measurable. |
| | 1.3 | 337 | ca. 80° | Just below range of testing apparatus. |
| 3,4-Dimethyl | 2 | 182 | 112–113° | 3,100. |
| | 1.94 | 1,000 | 100–115° | 3,600. |
| | 1.9 | 714 | 93–98° | 3,800. |
| 3-Methyl-5-ethyl | 2 | 196 | 100–102° | 3,720. |
| | 1.9 | 719 | 67° | 2,900. |
| | 1.9 | 2,200 | 115° | 3,500. |
| | 1.5 | 618 | 130° | 600. |

Contrary to the teaching of the observer referred to above, we have discovered that, at least insofar as vulcanizing action is concerned, the reaction products of the present invention need not be resols. A resol as defined by Carlton Ellis in "The Chemistry of Synthetic Resins" (Reinhold Publishing Corp., New York, N. Y., 1935), page 335, is "a resin of the type hardenable by heat to a final insoluble and infusible condition, but reacted only to the stage where it still melts when heated . . ." 3,5-substituted phenols are included among the type under consideration and are classified as Type III phenols according to the conventional classification system which is described in "The Chemistry of Commercial Plastics" (Reinhold Publishing Corp., New York, N. Y., 1947), by R. L. Wakeman, pages 121–123. As Type III phenols they should combine with formaldehyde in an alkaline medium under mild conditions to give resols. We find they do. However, included within the definitions of phenols satisfactory for the purpose of the present invention are those having a substituent in the 2, 4 or 6 position. Such phenolic compounds do not yield resols when reacted with formaldehyde, but have been determined, in accordance with the present invention, to be excellent vulcanizing agents. The point here made is that the vulcanizing agents of the present invention need not be resols, but instead may be non-resols.

The important factor in determining the vulcanizing properties of reagents of the present invention other than the molecular ratio of the formaldehyde to phenol is the number of carbon atoms contained collectively in R and R'. In accordance with the present invention, R and R' must contain less than 4 carbon atoms.

In general, polymers of butadiene, copolymers of butadiene and admixtures of polymers and copolymers of butadiene may be vulcanized in accordance with the present invention by intimately admixing a relatively small percentage by weight of the selected vulcanizing agent of the present invention in the rubber to be vulcanized and subjecting the resultant admixture to an elevated temperature. As in the case of vulcanizing butadiene rubbers with sulfur, high tensile strength characteristics of the products of the present invention necessitate the inclusion of a reinforcing type filler. Among the many reinforcing fillers, carbon black made by the channel process is considered the most outstanding one. However, suitable reinforcing fillers include furnace-type carbon blacks, soft gas blacks, zinc oxide, magnesium carbonate, calcium silicate, whiting, hard clays, silica, et cetera.

The physical properties of polymers of butadiene, copolymers of butadiene and admixtures of the same vary from those which are relatively tough and nervy such as GRN to those which are relatively more soft and easily workable such as GRS compositions which are specifically designed for easy workability. Thus the selection of any particular butadiene rubber will dictate the degree of breakdown necessary. Temperature becomes a more increasingly important factor generally as the degree of breakdown necessary increases. The conventional Banbury mixer or other rubber compounding machines are suitably equipped for controlling the temperature of breakdown.

Upon completion of the breakdown period, fillers if not previously incorporated are added as are pigments, plasticizers, anti-oxidants, et cetera. In general, where the temperature of breakdown is high, it may prove desirable to add the vulcanizing agents of the present invention after the addition of the other agents. Such an order of addition may serve to eliminate premature vulcanization. In conventional synthetic rubber compounding, it is the usual practice to use sulfur as the vulcanizing agent. To promote the vulcanizing action of sulfur, it is customary to add an organic accelerator such as, for example, "Santocure," which is said to be N-cyclohexyl-2-benzothiazylsulfenamide. An inorganic accelerator such as zinc oxide is also included. Then, to activate the zinc oxide in such a way that it will accelerate sulfur vulcanization, it is desirable to add a fatty acid such as stearic acid. Furthermore, since the synthetic rubbers do not break down readily in processing, it is difficult to incorporate the aforesaid compounding agents in the rubber, and, consequently, it is general practice to add a softener such as a hydrocarbon oil to improve processing. Finally, since sulfur vulcanizates tend to degrade under the action of heat and oxygen, age-resistors such as "BLE" are added. "BLE" is a reaction product of diphenylamine and acetone in the form of a non-volatile amber-colored liquid with a specific gravity of 1.087.

The vulcanizing agents of the present invention have a four-fold function. First, they act as plasticizing agents. In ordinary processing when sulfur is used as the vulcanizing agent, it is customary to add, in addition to the sulfur, one of the common plasticizing agents to soften up the rubber to the point where it can be easily worked. After the processing, the plasticizer remains in the rubber as a foreign substance, in many cases imparting undesirable properties to the rubber. However, when the resins of the present invention are used, they act as plasticizing agents, allowing the rubber to be worked in the absence of additional plasticizing agents. Then, after they have served their purpose as plasticizing agents, they enter into the vulcanizing process, so that there are no plasticizing agents left in the finished product as foreign substances.

Second, they eliminate the need for the agents described above. Third, they serve as vulcanizing agents. Finally, they serve as antioxidants, protecting the ultimate product from the action of heat and oxygen. The antioxidants and accelerators may, however, be added in the conventional manner when it is desired to enhance the specific properties over and above that degree obtainable by the use of the resin alone, but the advantage of the use of the resin is still manifested inasmuch as a smaller amount of these agents may be used when used in conjunction with the resin.

Selection of the amount of vulcanizing agent in accordance with the present invention is governed by the characteristics of the product desired as well as the selection of the particular butadiene polymer, copolymer, or admixture of the same. Where it is desirable that the characteristics of the butadiene rubber predominate in the resulting product, it is advisable to employ minimum quantities of the vulcanizing agents of the present invention. For example, a composition including 2% by weight of a vulcanizing agent of the present invention when vulcanized has exceptionally good tensile strength. An increase of the percentage composition by weight of the vulcanizing agent increases the hardness and the elastic modulus while decreasing the percent elongation of the product. Increasing the phenolic resin content to, for example, 30%, will obtain a product of greater hardness, greater elastic modulus, lower percent elongation, greater heat resistance and improved surface finish. From the foregoing, it will be apparent many factors govern the selection of the amount of vulcanizing agent to be incorporated in the butadiene rubber prior to vulcanization. Examples presented hereinafter will illustrate some of the variations of properties obtainable by a choice of varied amounts of vulcanizing agents.

The products of the present invention exhibit high tensile strength, in many cases almost 4,000 pounds per square inch, high elongation, and excellent solvent resistance to such solvents as benzene, toluene, carbon tetrachloride etc. Unlike sulfur vulcanizates, they show no tendency to bloom and they are highly resistant to change in mechanical and electrical properties on heat aging.

The following examples will illustrate the preparation of the vulcanizing agents of the present invention, vulcanization of different butadiene rubbers, and the properties of these vulcanized rubbers:

*Example 1*

Reaction products of formaldehyde and commercial 2,5-dimethylphenol were prepared as follows:

(a) Four mols of formaldehyde in the form of "Methyl Formcel" (40% solution of formaldehyde in methanol) and 1 mol of the phenol were mixed and cooled to 2–3° C. To this solution was added a mol of KOH in the form of a 50% aqueous solution, the solution being agitated and maintained at 2–3° C. during the addition. The mixture was reacted at this temperature for 91 hours, at the end of which time titration analysis indicated that 1.7 mols of formaldehyde had reacted with the phenol.

The mixture was treated with an excess of $Na_2SO_3$ solution and then rendered neutral with acetic acid. An organic layer separated, and was set aside. The remaining aqueous layer was chilled to 3° C., whereupon it deposited a crop of crystals. The crystals were separated and purified by recrystallization from chloroform to a constant melting point of 99.5–101° C. Analysis showed: C, 66.15, 66.03%; H, 7.58, 7.59%; OH, 27.8%; calculated for 2,4-dimethylol-3,6-dimethylphenol $C_{10}H_{14}O_3$; C, 65.91%; H, 7.74%; OH, 28.0%. The compound gave a blue color with ferric chloride.

(b) The same proportions of reactants were employed as in (a) above but the mixing and reaction were conducted at room temperature and the product was neutralized after 22 hours. The separated crystalline product was recrystallized from methanol to a constant melting point of 173–175° C. Analysis showed: C, 71.40, 71.24%; H, 7.11, 7.52%; molecular weight as determined by the method of freezing point depression described in "Experimental Physical Chemistry" by Daniels, Mathews and Williams, 4th edition, pages 84–86 and using 3,5-diisopropylphenol as the cryoscopic solvent 325; calculated for the dimethylol derivative of 2,5,2′,5′ tetramethyl-4,4′-dihydroxy diphenyl methane $C_{19}H_{24}O_4$: C, 72.12%; H, 7.65%; molecular weight 316.

(c) A mixture of 1 mol of the phenol, $\frac{1}{40}$ mol of NaOH and 1.48 mols of aqueous (37%) formalin was boiled together for about 30 minutes. The resulting resin was washed with water and vacuum dried. The molecular weight as determined by the method of (b) above was 500. This molecular weight corresponds to a resin having approximately 3 phenolic nuclei per unit molecule.

(d) The dimethylol compound of (a) above was heated for 20 minutes at 150° C. and gave off 9.4% of water. The product which remained was a resin which melted at 110–120° C. and which had an average molecular weight of 910 as determined cryoscopically in dioxane by the method previously mentioned.

The reaction products described under (a), (b), (c) and (d) above were intimately admixed in a GRS type 1601–O rubber and cured for the purpose of determining their vulcanizing properties. In each case 10% by weight of the phenolic derivative based on the weight of the GRS was milled into the rubber stock at a temperature of approximately 30° C. until intimate admixture was obtained. The resultant intimate admixture was cured in a mold under pressure at a temperature of approximately 165° C. for approximately 2 hours. Each of the resulting products was then tested for tensile strength, percent elongation, and solubility in benzene. The following tabulated data summarizes the results obtained:

| Product Tested | Tensile Strength in Lbs./Sq. In. | Percent Elongation | Solubility in Benzene |
|---|---|---|---|
| (a) | 1,100 | 580 | Insoluble. |
| (b) | 2,850 | 425 | Do. |
| (c) | 1,250 | 460 | Do. |
| (d) | 1,500 | 455 | Do. |

When 5% by weight of zinc oxide based on the GRS was included with the dimethylol compound and cured as in (a) of the table above the tensile strength was increased from 1100 to 1760 pounds per square inch.

Similarly a mixture of commercial polybutadiene rubber (24 Mooney—86° F.) 100 parts by weight and 2,4-dimethylol-3,6-dimethylphenol 10 parts by weight was heated 2 hours at 165° C. and gave an elastic product insoluble in benzene and other common solvents.

Resin having the same vulcanizing properties as that described in (d) above may also be prepared more conveniently as follows. Instead of making and isolating a crystalline methylol compound as the intermediate, a resin is prepared by reacting 1 mol of phenol, 1 mol of NaOH and 2 mols of formaldehyde at about 20° C. until titration shows the presence of not more than 1% free formaldehyde. The alkali is then neutralized with acetic acid which precipitates the resin. The resin is washed with water to free it from salts and is dehydrated by heating in vacuum to give a brittle resin comparable in molecular weight and vulcanizing properties to that described under (d) above.

*Example 2*

A dimethylol compound of 3,5-dimethylphenol was prepared by reacting 4 mols of formaldehyde in the form of "Methyl Formcel" and 1 mol of phenol in the presence of 1 mol of potassium hydroxide as catalyst at room temperature for about 4 hours.

On cooling crystals separated from the reaction mixture. The crystals were filtered off and dissolved in a small amount of water at 25° C. Acetic acid was added to adjust the pH to 6 and the mixture was cooled to about 10° C. The crude crystalline dimethylol compound separated and was recovered and purified by recrystallization from ethyl acetate and from methanol to a constant melting point of 150–151° C. Combustion analysis showed: C, 66.83, 66.81%; H, 8.02, 8.26%; calculated for 2,6-dimethylol-3,5-dimethylphenol $C_{10}H_{14}O_3$: C, 65.91%; H, 7.75%. The compound gave a blue color with ferric chloride. It appears identical with the 2,6-dimethylol-3,5-dimethylphenol prepared by other means by Finn and Musty (Journal of Applied Chemistry (London) 2, 88–90 (1952)).

The dimethylol compound of 3,5-dimethylphenol was tested for its vulcanizing properties as described in Example 1 above by intimately admixing a composition comprising:

| | Parts by weight |
|---|---|
| GRS rubber hydrocarbon | 66 |
| Carbon black | 33 |
| Dimethylol compound | 5 |
| ZnO | 5 |

For the purpose of curing the resulting intimate admixture, a temperature of 165° C. was employed for 2 hours. The resulting product had a tensile strength of 2350 pounds per square inch, a percent elongation of 750%, and was insoluble in benzene.

Comparable results were obtained when the catalyst zinc oxide was replaced with zinc stearate or when the zinc oxide was omitted.

*Example 3*

(a) The mononuclear dialcohol of 3-methyl-5-ethylphenol was prepared using the technique described in Example 1 (a) above by reacting 3-methyl-5-ethylphenol with the same reactants in the same proportions for 23 hours. On completion of the neutralization, the organic product obtained was recrystallized from benzene and from chloroform to a constant melting point of 104.5–105.5° C. Combustion analysis showed: C, 67.49, 67.29%; H, 8.50, 8.37%; calculated for dimethylol-3-methyl-5-ethyl phenol $C_{11}H_{16}O_3$: C, 67.32%; H, 8.21%.

(b) The dimethylol compound of (a) above was heated for 5 minutes at 130° C., thereby undergoing a weight loss of 7.2%. The product was a clear resin of an average molecular weight of 719 as measured by the method of Example 1 (b) in dioxane. If the resinification had occurred by the formation of methylene ether linkages between 4 mols of the dialcohol, 3 mols of water would have been lost. This would have corresponded to a weight loss of 6.9% and would have given a resin of molecular weight 730.

(c) The dimethylol compound of (a) above was heated for 15 minutes at 130° and gave off 8.1% of water and 0.3% of formaldehyde. The resulting resin had an average molecular weight of 2184 as measured by the method of Example 1 (b) in dioxane. If the resinification had occured by the formation of methylene ether linkages between 12 mols of the dialcohol, 11 mols of water would have been lost. This would have corresponded to a weight loss of 8.4% and would have given a resin of molecular weight 2154.

The dimethylol compound of 3-methyl-5-ethyl phenol was tested in GRS rubber as described in Example 1 for its vulcanizing properties. In this instance GRS type 1601–O rubber was vulcanized by adding 5% of the dialcohol. Temperature and time of vulcanization were the same. The resulting product had a tensile strength of 3500 pounds per square inch, a percent elongation of 490% and was insoluble in benzene.

When the amount of the dialcohol was reduced from 5% to 2% the mixture was still readily vulcanizable, yielding a benzene-insoluble product with a tensile strength of 1300 pounds per square inch and an elongation of 650% after two hours cure at 165° C. Since the molecular weight of the dialcohol is 196 as compared with the value of 32 for the atomic weight of sulfur, it will be noted that the molecular ratio of dialcohol to rubber used (2% on the GRS 1601–O or 3% on the contained rubber hydrocarbon) corresponds to:

$$3 \times \frac{32}{196} = 0.49\% \text{ sulfur}$$

Inasmuch as it is customary to use about 2% by weight of sulfur to vulcanize GRS it is obvious that this dimethylol phenol constitutes an unexpectedly effective vulcanizing agent.

Illustrating the action of the dialcohol of 3-methyl-5-ethyl phenol on GRS rubber in the presence of a siliceous filler, the following mixture was prepared: Hi-Sil (an ultra fine silica coloring pigment) 58.5 parts by weight, GRS rubber 100 parts by weight, dialcohol 10 parts by weight. When heated for one hour at 165° C. the mixture gave a benzene-insoluble vulcanizate with a tensile strength of 2010 pounds per square inch and an elongation of 480%.

The resin of (b) above (molecular weight 719) when incorporated in the amount of 10% by weight in GRS type 1601–O and heated 45 minutes at 165° C. gave a vulcanizate with a tensile strength of 2900 pounds per square inch and an elongation of 510%. Likewise the resin of (c) above (molecular weight 2184) similarly admixed in GRS rubber and heated 60 minutes at 165° C. gave a vulcanizate with a tensile strength of 3250 pounds per square inch and an elongation of 610%.

Illustrating the action of the resin of (b) above (molecular weight 719) on other rubbers a mixture of 10 parts by weight of this resin, 100 parts by weight of polybutadiene rubber and 50 parts by weight of carbon black was prepared. When this mixture was heated 60 minutes at 165° C. a benzene-insoluble vulcanizate resulted having a tensile strength of 880 pounds per square inch and an elongation of 180%. A mixture of 10 parts by weight of the resin of Example 3(b) and 100 parts by weight of butadiene-acrylonitrile copolymer (Hycar OR–15) was also prepared without added filler and heated two hours at 165° C. The product was insoluble in benzene and other common solvents and had a tensile strength of 800 pounds per square inch and an elongation of 490%.

*Example 4*

(a) The mononuclear dialcohol of 3,4-dimethylphenol was prepared using the technique described in Example 3(a) above by reacting 3,4-dimethylphenol with the same reactants in the same proportions at the same temperature for 46 hours. The resulting product was recrystallized from benzene and from chloroform to obtain a constant melting point of 112–113° C. Combustion analysis showed: C, 66.33, 66.53%; H, 7.87, 8.00%; calculated for 2,6 - dimethylol - 3,4 - dimethylphenol, $C_{10}H_{14}O_3$: C, 65.91%; H, 7.74%. The compound gave a blue color with ferric chloride. It appears identical with the compound prepared by Ziegler and co-workers (Monatsh. 80, 294 (1949)) using a slightly different procedure.

(b) The dimethylol compound of (a) above was heated 10 minutes at 150° C., thereby losing 10% of its weight. The resulting resin had a molecular weight of 714 as measured by the method of Example 1(b) in dioxane.

The mononuclear dialcohol as produced in (a) above and the corresponding resin of molecular weight 714 as produced in (b) above were tested for their vulcanizing properties. The stock vulcanized in this instance was a GRS-carbon black mixture containing approximately 66 parts by weight of butadiene-styrene copolymers and 33 parts by weight of carbon black.

| Percent by Weight Phenolic Material Based on the Rubber Stock Weight | Tensile Strength, p. s. i. | Elongation, Percent | Solubility in Benzene | Cure Time, Hours |
|---|---|---|---|---|
| Dialcohol (a) | 5.0 | 2,815 | 600 | Insoluble | 2.0 |
| Do | 10.0 | 2,510 | 400 | ___do___ | 1.5 |
| Resin (b) | 10.0 | 3,680 | 550 | ___do___ | 2.0 |
| Do | [1] 10.0 | 3,740 | 730 | ___do___ | 1.0 |

[1] Five parts by weight of zinc oxide also added.

We claim:

1. A vulcanized material comprising the reaction product between a vulcanizable 1,3-butadiene rubbery polymer and a vulcanizing agent which is the reaction product of at least 1.2 mol of combined formaldehyde per mol of phenol selected from the group consisting of 2,5-dimethylphenol, 3,5-dimethylphenol, 3-methyl-5-ethylphenol and 3,4-dimethylphenol.

2. A vulcanized material comprising the reaction product between a vulcanizable 1,3-butadiene rubbery polymer and a vulcanizing agent which is the reaction product of at least 1.2 mol of combined formaldehyde per mol of 2,5-dimethylphenol.

3. A vulcanized material comprising the reaction product between a vulcanizable 1,3-butadiene rubbery polymer and a vulcanizing agent which is the reaction product of at least 1.2 mol of combined formaldehyde per mol of 3,5-dimethylphenol.

4. A vulcanized material comprising the reaction product between a vulcanizable 1,3-butadiene rubbery polymer and a vulcanizing agent which is the reaction product of at least 1.2 mol of combined formaldehyde per mol of 3-methyl-5-ethylphenol.

5. A vulcanized material comprising the reaction product between a vulcanizable 1,3-butadiene rubbery polymer and a vulcanizing agent which is the reaction product of at least 1.2 mol of combined formaldehyde per mol of 3,4-dimethylphenol.

6. A method of vulcanizing a vulcanizable 1,3-butadiene rubbery polymer which comprises the steps of intimately admixing in the polymer a vulcanizing agent which is the reaction product of at least 1.2 mol of combined formaldehyde per mol of phenol selected from the group consisting of 2,5-dimethylphenol, 3,5-dimethylphenol, 3-methyl-5-ethylphenol and 3,4-dimethylphenol, and subjecting the resulting admixture to an elevated temperature.

7. A method of vulcanizing a vulcanizable 1,3-butadiene rubbery polymer which comprises the steps of intimately admixing in the polymer a vulcanizing agent which is the reaction product of at least 1.2 mol of combined formaldehyde per mol of 2,5-dimethylphenol, and subjecting the resulting admixture to an elevated temperature.

8. A method of vulcanizing a vulcanizable 1,3-butadiene rubbery polymer which comprises the steps of intimately admixing in the polymer a vulcanizing agent which is the reaction product of at least 1.2 mol of combined formaldehyde per mol of 3,5-dimethylphenol, and subjecting the resulting admixture to an elevated temperature.

9. A method of vulcanizing a vulcanizable 1,3-butadiene rubbery polymer which comprises the steps of intimately admixing in the polymer a vulcanizing agent which is the reaction product of at least 1.2 mol of combined formaldehyde per mol of 3-methyl-5-ethylphenol, and subjecting the resulting admixture to an elevated temperature.

10. A method of vulcanizing a vulcanizable 1,3-butadiene rubbery polymer which comprises the steps of intimately admixing in the polymer a vulcanizing agent which is the reaction product of at least 1.2 mol of combined formaldehyde per mol of 3,4-dimethylphenol, and subjecting the resulting admixture to an elevated temperature.

References Cited in the file of this patent

UNITED STATES PATENTS

| | | |
|---|---|---|
| 1,800,296 | Honel | Apr. 14, 1931 |
| 2,079,210 | Honel | May 4, 1937 |
| 2,165,380 | Honel | July 11, 1939 |
| 2,211,048 | Bitterich | Aug. 13, 1940 |